UNITED STATES PATENT OFFICE.

DAVID K. TUTTLE, OF PHILADELPHIA, PENNSYLVANIA, AND CABELL WHITEHEAD, OF WASHINGTON, DISTRICT OF COLUMBIA.

PROCESS OF TREATING PRECIOUS-METAL-BEARING SLIMES.

SPECIFICATION forming part of Letters Patent No. 509,633, dated November 28, 1893.

Application filed February 20, 1892. Serial No. 422,206. (No specimens.)

*To all whom it may concern:*

Be it known that we, DAVID K. TUTTLE, residing at Philadelphia, in the county of Philadelphia, State of Pennsylvania, and CABELL WHITEHEAD, residing at Washington, in the District of Columbia, citizens of the United States, have invented certain new and useful Improvements in Processes of Treating Precious-Metal-Bearing Slimes; and we do hereby declare the following to be a full, clear and exact description of the invention, such as will enable others skilled in the art to which it appertains to make and use the same.

In the electrolytic refining of crude copper containing precious metals, plates of the crude copper are immersed in a suitable liquid, and subjected to the action of the electric current. By this process copper is dissolved at the anode, and deposited upon the cathode in a pure condition, while the precious metals remain unacted upon. This forms an excellent process for the preparation of pure copper, but the precious metals are left in a very undesirable condition.

The residues obtained from the electrolytic copper process consist of a mixture of very fine particles, constituting the more valuable part, or the slimes proper, and of pieces of copper of considerable size. These latter are of two kinds: first, bits of the original crude copper that have become detached and fallen off from the anodes, and noses of copper that have formed on the cathode, and have afterward been broken off. The residues are therefore passed over a suitable screen to remove the coarse pieces of copper, which are sent to the melting furnace, or otherwise disposed of, leaving the fine material as slimes. These final residues or slimes, which it is the object of our process to treat, contain the precious metals, and nearly all of the impurity of the crude copper, largely in the metallic state, but some in a more or less oxidized condition. Besides their proper metallic constituents, the slimes contain extraneous matter, or dirt, frequently organic matters, derived from the lining material of the electrolyzing tanks. The average composition of these slimes may be taken as about fifty per cent. precious metals and fifty per cent. impurities. Of the latter fifteen to thirty per cent. will be metallic copper, and twenty to thirty-five per cent. will consist of a number of elements such as arsenic, antimony, tellurium, selenium, bismuth, lead, iron, &c., some of which may be present in the metallic state, but for the most part are in a more or less oxidized condition, and some copper in an oxidized state.

Four principal methods have been proposed and used for the treatment of these slimes, but they are all incomplete and expensive. By one method the slimes are mixed with charcoal and melted. The resulting bars are then parted by the sulphuric acid process. The great objection to this process is that the impurities are not removed, and the resulting bullion has to undergo an expensive refining operation to secure fine metal. In the second process the slimes are cupelled with lead. This is an expensive operation, entailing the loss of the copper, and considerable loss of silver in the operation. The third process is to treat the slimes with hydric nitrate. This is an exceedingly expensive operation, and does not yield a fine bullion. The fourth process is to treat with strong hydric sulphate. This also yields a very impure bullion.

By our invention we secure the removal of the injurious impurities from the slimes, as a preliminary step, so that the precious metals can be obtained in a condition of great purity and the copper recovered in a useful form. These results are also secured at a much less expense than by any other known process.

By injurious impurities are meant those impurities such as arsenic, antimony, tellurium, selenium, bismuth, iron, &c., which injure the qualities of gold and silver so as to prevent the application of the precious metals to their common uses and must therefore be removed, when found in gold and silver, before the precious metals can be utilized. These same impurities also injure copper for many purposes, and the separation of them from the metallic copper in the slimes allows this metallic copper to be recovered in a much more useful form.

Our process may be divided into three parts: first, the removal of oxides, salts, and sub-salts of various metals present, as well as certain metals that are soluble in dilute acids;

second, the removal of the metallic copper; third, melting the residues with suitable fluxes to remove sulphate of lead. To these may be added a fourth step, which is the ordinary sulphuric acid parting operation, as practiced at the mints.

To more fully explain the action of our process we will describe it as it is actually carried out in connection with an electrolytic copper refinery, without, however, limiting ourselves to the exact mode of procedure laid down.

The first operation can be carried out in any suitable tank provided with means for heating. A proper amount of dilute, say ten to twenty per cent., acid, either sulphuric or hydrochloric, is run into the tank, the slimes added, and heat applied. After from ten to thirty minutes boiling it will be found that the oxides, salts and subsalts, together with some of the metals, have gone into solution, leaving, however, the gold and silver behind. When this has been effected the acid solution is separated from the purified residues by any suitable means. By this operation the injurious impurities consisting of arsenic, antimony, tellurium, selenium, bismuth, iron, &c., are dissolved and removed. The copper that is present in the oxidized condition is also dissolved and removed. Should, by any chance, silver go into solution it would be at once returned to the metallic state and precipitated by contact with the large excess of metallic copper present in the residue. As this process will be generally carried on in connection with the electrolytic copper refining the slimes may be run directly into the dissolving tanks without any intermediate drying. If the solution from this first treatment contains a sufficient amount of copper to make it pay, that metal may be readily recovered as cement copper by passing the solution over metallic iron. The purified residues now consist of metallic silver, gold and copper, and sulphate of lead, and are ready for the second step of the process. This step can be carried out in a variety of ways. The residues may be dried and subjected at once to the action of hot hydric sulphate in the form of oil of vitriol, either with or without previous melting. By this operation the copper and the silver will be dissolved leaving the gold unattacked. The silver can be reduced from this solution by metallic copper, and the residues can be melted, preferably with oxidizing fluxes, to obtain fine gold. The presence of large amounts of copper, however, render this operation tedious, uncertain and incomplete, through the formation of an anhydrous and insoluble sulphate of copper in large amounts. We find it much preferable to place the purified residues in a tank with a suitable quantity of water, and then add a solution containing a salt of silver, preferably the sulphate of silver.

When the sulphate is used the following reaction takes place: $Ag_2SO_4$ plus $Cu$ equals $2Ag$ plus $CuSO_4$. The metallic copper will go into solution, and be separated from the gold and silver. The sulphate of silver is added until the solution in the tank, after a thorough mixing, shows a slight silver reaction with sodium chloride. As soon as silver remains in solution all of the copper has been dissolved. If the screen used to separate the copper from the slimes be a coarse one such as to allow particles of copper of any considerable size to pass through, it may be advisable to heat the contents of the tank in order to hasten the reaction, but if the proper screen has been used the reaction is almost instantaneous, and is finished by the time the mixing has been completed. The solution of copper containing a slight trace of silver is now separated from the residue by any suitable means, and reserved for use in a subsequent step of the process; or this trace of silver may be removed by the cautious addition of small portions of the purified residues until the solution no longer gives a silver reaction. The filtered solution may then be returned to the copper electrolytic tanks. The residue remaining after this operation consists of the gold and silver of the slimes in the metallic state, now freed from the injurious elements and from metallic copper of the slimes, together with the metallic silver precipitated in dissolving and replacing the metallic copper, and a little lead in the form of sulphate. This residue is next dried in any suitable way, mixed with sand and niter, or other suitable fluxes, preferably of an oxidizing nature, and melted. This melting removes the sulphate of lead and yields a bullion showing nine hundred and seventy to nine hundred and ninety-nine fine in gold and silver. The melted bullion may be granulated, or cast into bars of any suitable form. The bullion is now put into dissolving kettles and heated with hydric sulphate. This dissolves the silver, leaving the gold behind in the metallic state. The solution of sulphate silver is separated from the gold in well known ways, and the gold is melted, and cast into bars, or otherwise utilized. A part of the solution of sulphate of silver obtained in this operation can be used in the separation of copper in the second stage of the process. The balance is run into precipitating tanks to which has already been transferred the solution of sulphate of copper, containing a slight amount of silver, that was obtained in removing the metallic copper from the purified slimes by treatment with sulphate of silver, as has been described, or otherwise diluted. Here the silver is next reduced to a metallic state, and precipitated by plates or ingots of metallic copper. When all the silver has been reduced the acid solution of sulphate of copper is separated from the metallic silver, and may be utilized in a variety of ways. The copper may be precipitated, preferably in the metallic state, or the sulphate of copper may be recovered by crystallization, but, since this acid solution contains exactly the elements required to keep up the composition of the bath in the electrolytic refining of copper, our practice is to employ it for that purpose. The silver sponge is sweetened, dried and melted as usual, or otherwise utilized.

In the electrolytic refining of copper it is necessary to keep the bath constant in composition, and, to supply the losses incident to the process, it is necessary from time to time to add acid and water, and the acid solution of sulphate of copper that we obtain is exactly suited for this purpose. In this way the excess of acid necessarily used in the parting process, the copper to reduce the silver, and the metallic copper recovered from the slimes are all saved and utilized without further expense.

The process as above described we regard as the best practice, but it is evident that circumstances may modify the process without departing from our invention. Thus while we have described the removal of the injurious impurities, and the removal of the metallic copper as separate steps it is evident that under certain conditions these two steps may be combined into one operation. In cases where the purity of the resulting copper solution is not an object of paramount importance, for instance, the slimes may be treated at once with a sufficiently acid solution of a silver salt to dissolve the injurious impurities, and to bring the copper into solution by replacement with silver.

While the process is described as being applied to the slimes from the copper electrolytic process, the same principles may be applied to the slimes obtained in electrolytic processes of refining any metal more electropositive than silver when these slimes carry precious metals. Moreover slimes similar in composition produced in other processes may also be treated in the same manner.

What we claim as new and valuable is—

1. The process of treating slimes containing gold, silver and impurities, which consists in simultaneous separating arsenic, antimony, tellurium bismuth and other impurities present as oxides by the action of dilute acid, and melting the gold and silver, substantially as described.

2. The process of treating precious-metal-bearing slimes, which consists in subjecting the slimes to the action of dilute acids to dissolve the metals and oxides soluble therein, and to the action of a solution of a salt of silver to remove metals more electro-positive than silver that are present in the metallic state, substantially as described.

3. The process of treating slimes from the electrolytic process of refining copper, which consists in simultaneous separating arsenic, antimony, tellurium, bismuth and other impurities present as oxides, and the metallic copper from the gold and silver by the action of an acid aqueous solution of a salt of silver, and melting the final residue, substantially as described.

4. The process of treating slimes from the electrolytic process of refining copper, which consists of the following steps in order, removing the arsenic, antimony, tellurium, bismuth and other impurities present as oxides, removing the metallic copper, and melting the final residue, substantially as described.

5. The process of treating slimes from the electrolytic process of refining copper, which consists in treating the slimes with dilute acid to remove arsenic, antimony, tellurium, bismuth and other impurities present as oxides, treating the purified slimes with solution of sulphate of silver to remove metallic copper, and melting the final residue, substantially as described.

In testimony whereof we affix our signatures in presence of two witnesses.

DAVID K. TUTTLE.
CABELL WHITEHEAD.

Witnesses:
N. B. BOYD,
ALEX. MICKLE.